(12) United States Patent
Tanz

(10) Patent No.: US 6,694,220 B1
(45) Date of Patent: Feb. 17, 2004

(54) DEVICE FOR HANDLING INDIVIDUALLY PACKAGED GOODS

(75) Inventor: Torsten Tanz, Grapevine, TX (US)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 10/009,077
(22) PCT Filed: May 24, 2000
(86) PCT No.: PCT/DE00/01664
§ 371 (c)(1), (2), (4) Date: Dec. 5, 2001
(87) PCT Pub. No.: WO00/76887
PCT Pub. Date: Dec. 21, 2000

(30) Foreign Application Priority Data

Jun. 15, 1999 (DE) .......................... 199 27 251

(51) Int. Cl.⁷ ............................... G06F 7/00
(52) U.S. Cl. ................. 700/226; 700/230; 700/255; 198/369.4
(58) Field of Search ................. 700/226, 225, 700/228, 229, 230, 255; 198/369.4, 395, 782, 787

(56) References Cited

U.S. PATENT DOCUMENTS

| | | | | |
|---|---|---|---|---|
| 4,997,077 A | * | 3/1991 | Meini et al. ............ | 198/341.05 |
| 5,000,305 A | * | 3/1991 | Lucas ..................... | 198/414 |
| 5,009,304 A | * | 4/1991 | Schmalzl ................ | 198/371.3 |
| 5,145,049 A | * | 9/1992 | McClurkin .............. | 198/374 |
| 5,186,417 A | * | 2/1993 | Pritchard ................ | 244/137.1 |
| 5,293,984 A | * | 3/1994 | Lucas ..................... | 198/414 |
| 5,396,977 A | * | 3/1995 | Lantis et al. ............ | 198/371.3 |
| 5,551,543 A | * | 9/1996 | Mattingly et al. ....... | 198/370.09 |
| 5,924,546 A | * | 7/1999 | Funaya ................... | 198/395 |
| 6,179,113 B1 | * | 1/2001 | Wunscher et al. ...... | 198/436 |
| 6,189,677 B1 | * | 2/2001 | Ruf et al. ................ | 198/411 |
| 6,328,523 B1 | * | 12/2001 | Watanabe et al. ...... | 414/416.01 |
| 6,471,044 B1 | * | 10/2002 | Isaacs et al. ............ | 198/809 |

* cited by examiner

Primary Examiner—Christopher P. Ellis
Assistant Examiner—Richard Ridley
(74) Attorney, Agent, or Firm—Van Dyke, Gardner, Linn & Burkhart, LLP

(57) ABSTRACT

The invention relates to an apparatus for handling individually packaged goods in an array-like, two-dimensional configuration. The apparatus has a plurality of conveying means arranged in the manner of an array. These conveying means, driven independently of one another at variable speed and in a selectable direction ensure the individual movement of the individually packaged goods to be processed. The control device, in conjunction with the image processing system, coordinates these individual movements in such a way that the randomly fed individually packaged goods can be separated, aligned, conveyed, sorted, stored and sequenced.

6 Claims, 13 Drawing Sheets

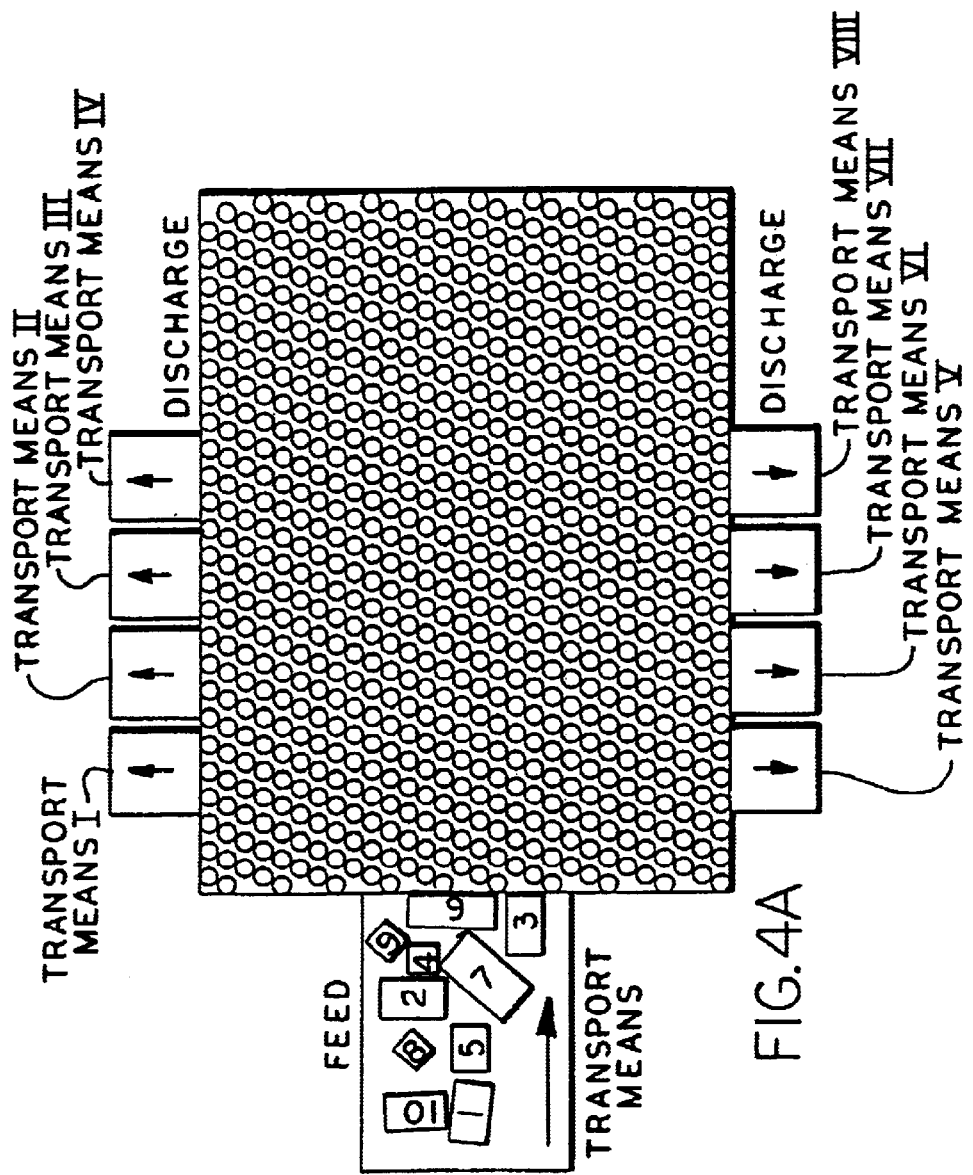

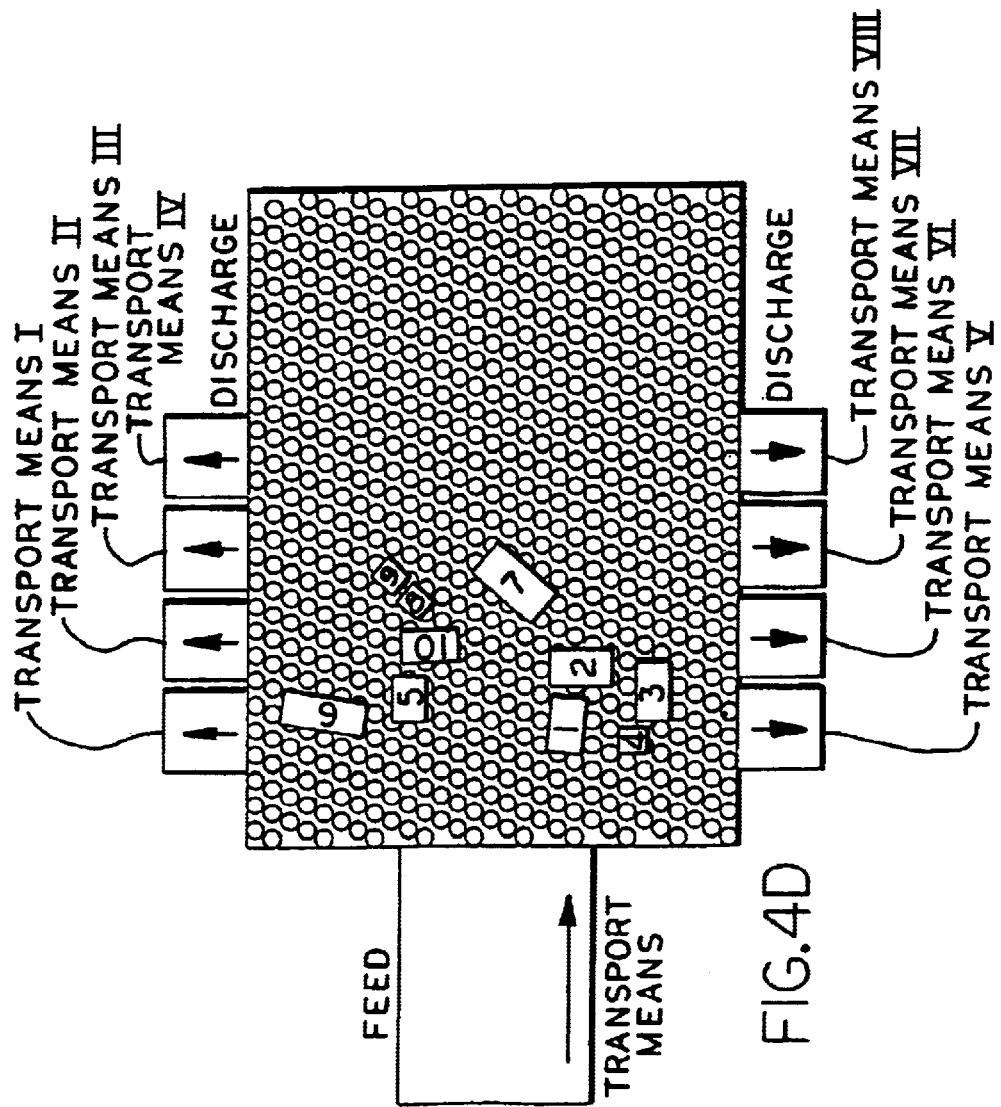

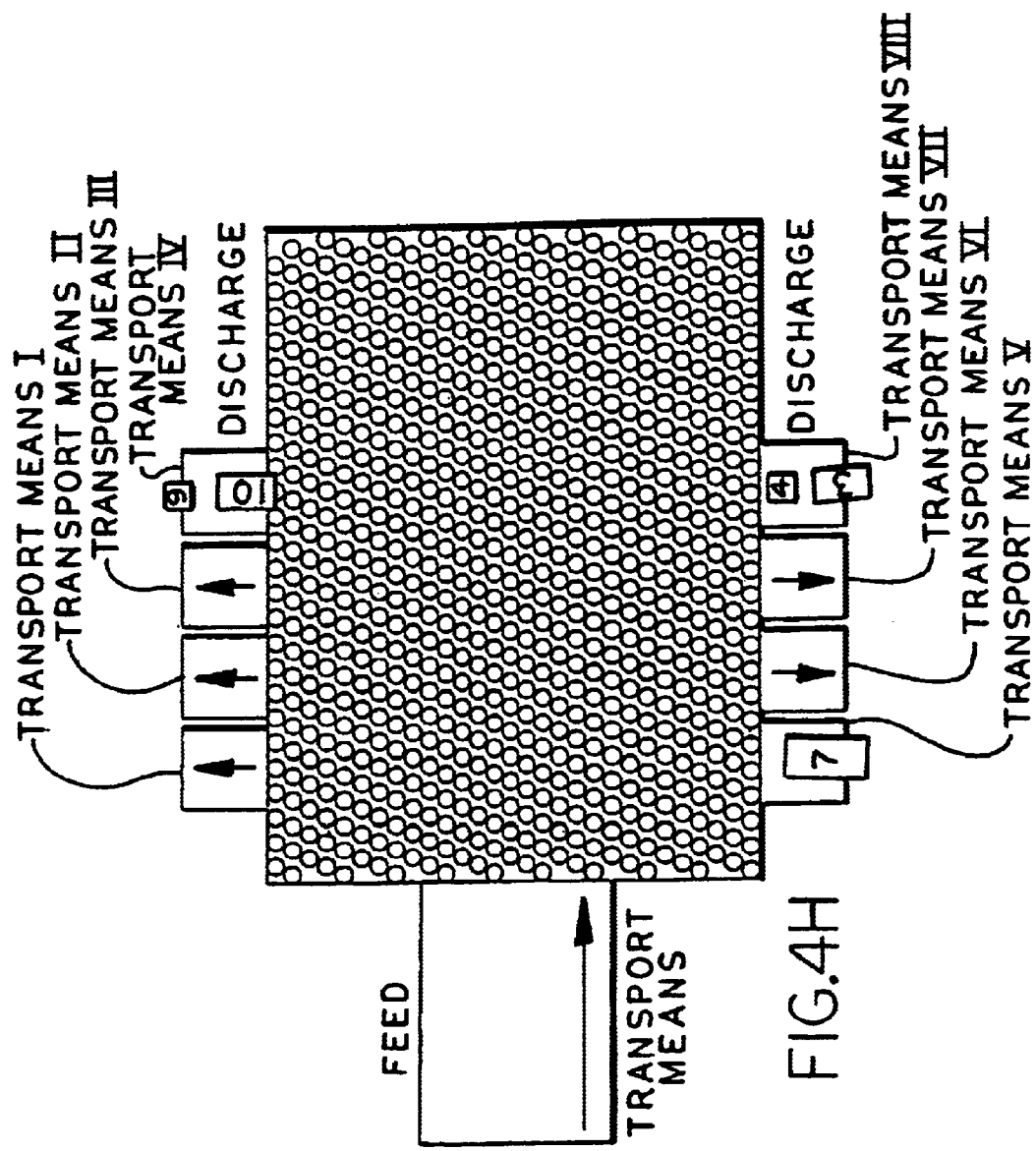

DEVICE FOR HANDLING INDIVIDUALLY PACKAGED GOODS

Figure 1:
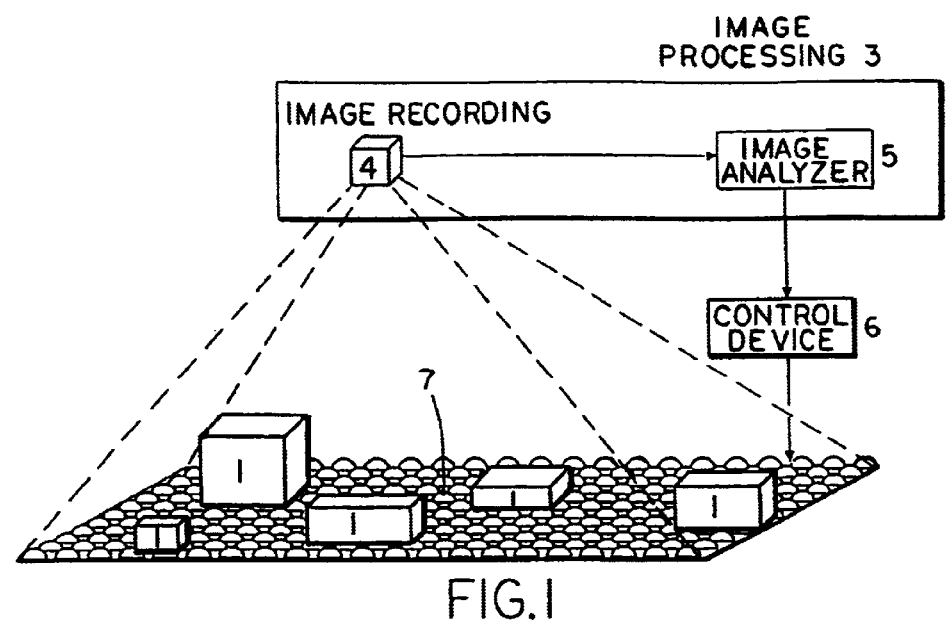

Apparatus for handling individually packaged goods The invention relates to an apparatus for handling individually packaged goods according to the preamble of claim 1. Here, handling is understood to mean separating and/or aligning and/or sorting and/or storing individually packaged goods, which are fed and discharged by transport means. Individually packaged goods are, amongst others, packages, packets, bundles of periodicals, containers, pallets and sack-like goods. The individually packaged goods are fed either unordered and lying beside one another, preprocessing ensuring that no individually packaged goods lie on one another, or the individually packaged goods are fed in separately at defined intervals. Following handling by the apparatus, the individually packaged goods are discharged in an ordered fashion to further processing. The ordered discharge can be used to produce a specific order (sequence) of the individually packaged goods at the output from the aforementioned arrangement, said sequence being necessary or advantageous for further processing.

According to the current prior art, there is no apparatus which carries out the functions of separation, alignment, storage, sorting including sequencing in a space-saving manner with little outlay. EP 780328 A1 and U.S. Pat. No. 5,638,938 describe separating devices for packages. The disadvantages of these known solutions are their great requirement for space, in particular overall length, and uncertain separation in the case of packages of different sizes. Aligning individually packaged goods at right angles to the conveying direction during transport by means of specific roller conveyors is prior art.

The sorting of individually packaged goods is at present implemented by means of various types of special techniques, which are all based on a linear or circular transport direction.

The following solutions may be mentioned: tilt tray sorters (see company publications from Crisplant A. S., Beumer K G), transverse belt sorters (see Sandvik, Crisplant A. S), pusher sorters (Sandvik, Lippert), shoe sorters (Dematic, TGW), popup sorters (Van der Lande; Dematic).

At present, individually packaged goods are stored or intermediately stored manually or with mechanical support (by being stacked on the floor, stored in racks by using fork-lift trucks), partly automated (in so-called straight-through stores, with manual or automatic loading), or fully automated in high-rack stores, which are loaded and emptied automatically by rack operating devices.

The invention specified in claim 1 is therefore based on the object of providing an apparatus for space-saving handling, which separates and/or aligns and/or stores and/or sorts the individually packaged goods, including doing so in accordance with a defined sequence. The array-like arrangement of the conveying means which convey the individually packaged goods in one plane in four directions at right angles to one another, and also the identification and continuous tracking of the individually packaged goods on the array area creates the precondition for moving and aligning the individually packaged goods freely without collision. The input or inputs and output or outputs are located at the edges of the array area. The movement is carried out in accordance with the handling to be carried out. If, for example, at an input individually packaged goods to be separated are transported onto the array area close beside one another and behind one another, then, following the determination of the orientation of the individually packaged goods, one item after the other is transported to an output with a defined spacing by means of specific activation of the conveying means needed for this purpose, alignment of the individually packaged goods at the same time being possible. If the individually packaged goods are to be sorted, then images of the individually packaged goods are recorded and the handling information, in this case addresses, is determined as sorting information. The transport to the outputs envisaged in accordance with the sorting plan is then carried out. During these transporting actions, which if possible are also carried out in parallel, continuous tracking of each individual item is carried out, so that the movements can be carried out in a defined and collision-free manner. If intermediate storage is necessary for the sequence, this is readily possible. The individually packaged goods can be stored intermediately, as required, both in a specific storage area and decentrally, it being possible for the store to be enlarged or reduced dynamically, and access to the stored individually packaged items is as desired, with high variability of the storage strategy.

The handling apparatus is therefore functionally very flexible and at the same time very compact.

Advantageous refinements of the invention are presented in the subclaims.

If the conveying means according to claim 2 is designed with a spherical transport part, which is mounted without a fixed axis and, for example, is driven electromechanically in such a way that the direction can be selected freely, then it is possible to accommodate many conveying means on a specific array area and, as a result of the free choice of direction, to cover the shortest possible distances with the individually packaged goods.

It is also advantageous, according to claim 3, to include the conveying speed and the acceleration and braking pattern in the control, in order in this way to be able to coordinate movement operations better with one another and to minimize the transport times of the individually packaged goods on the array area.

According to claim 4, it is advantageous to use a sensor device which records the height profile, in addition to the image recording and evaluating device, for the reliable identification and separation of the individually packaged goods, for example if they are adjacent to one another.

In order to track the movement of the individually packaged goods, it may also be advantageous, according to claim 5, to equip the conveying means with pressure sensors, which detect whether there is an item on the conveying means.

Figure 2:
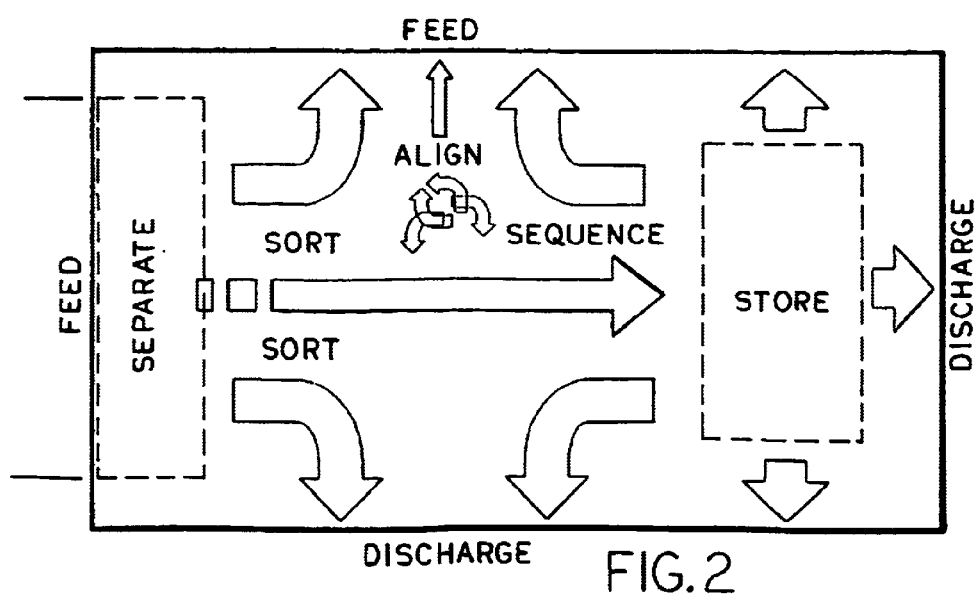
Figure 3A:
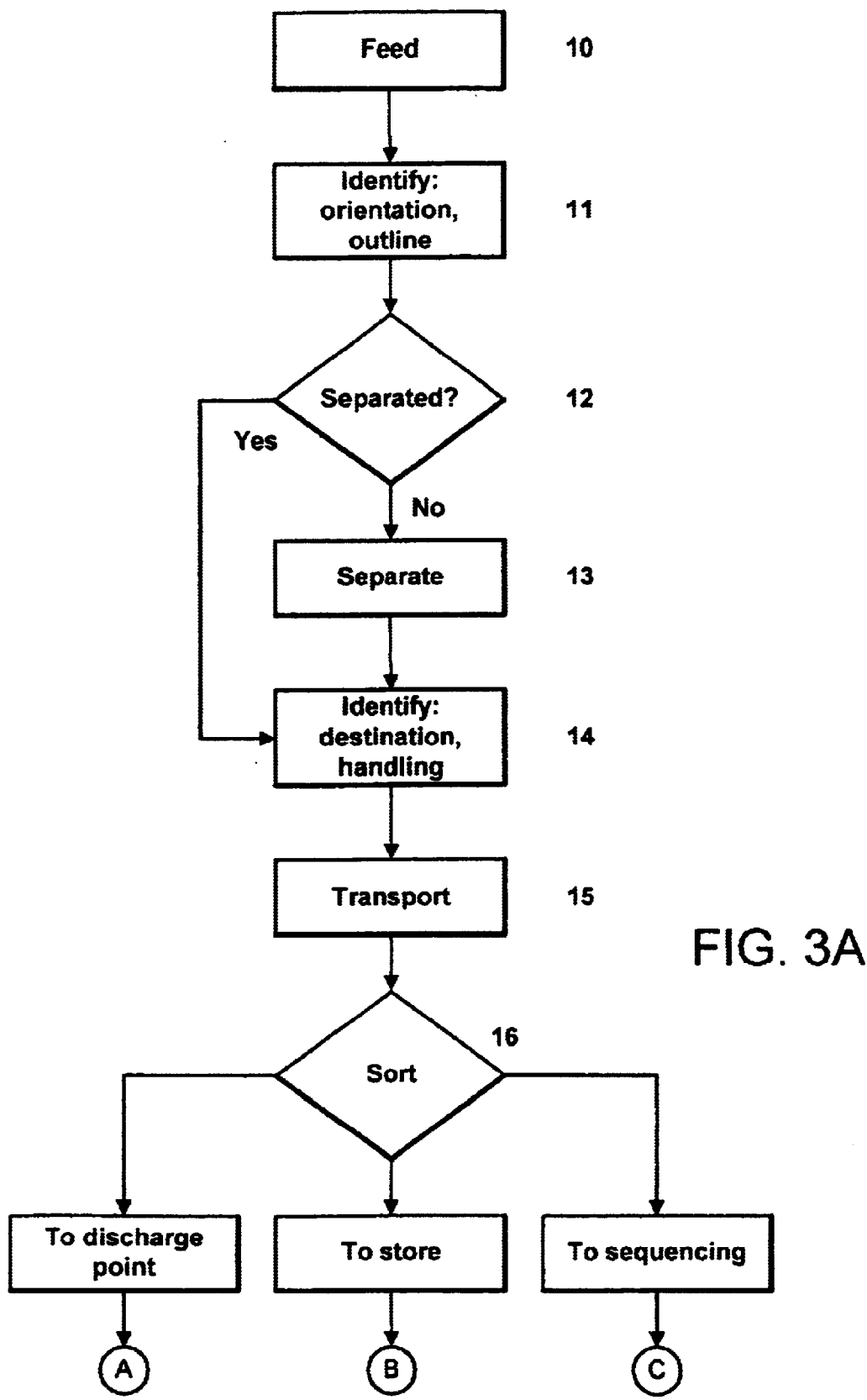
Figure 3B:
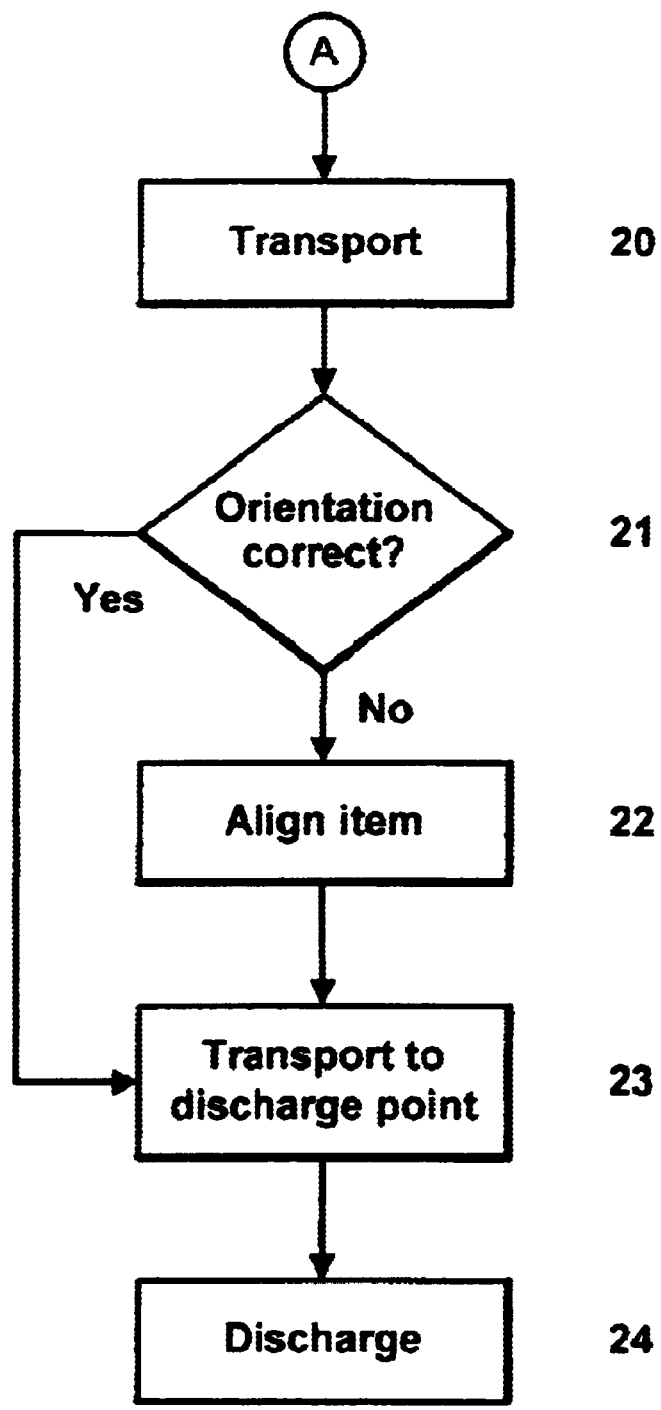
Figure 3C:
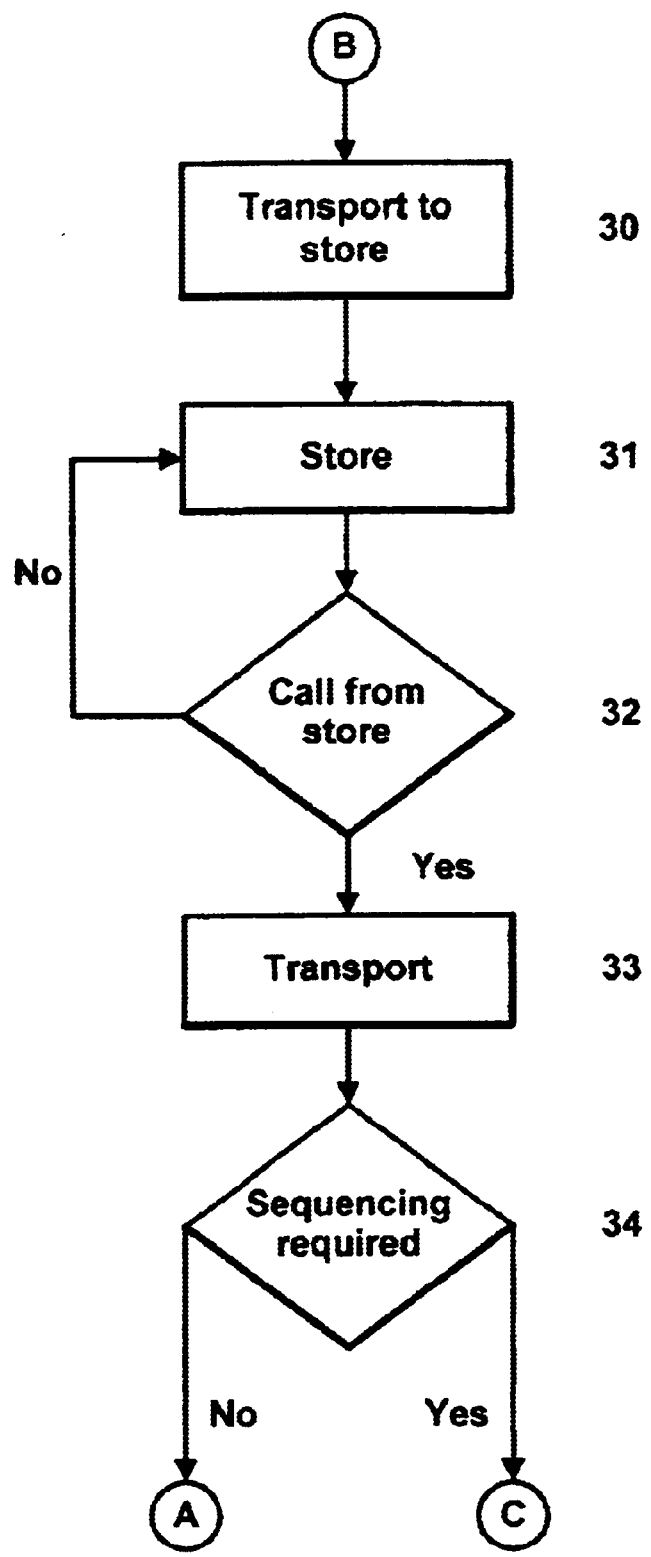

The invention will be explained in more detail below in an exemplary embodiment, using the drawings, in which:

FIG. 1 shows a schematic, blocked diagrammatic, three-dimensional illustration of the handling apparatus FIG. 2 shows a schematic plan view of the arrangement, representing the division into the functional areas of feeding, separating, sorting, storage and discharging FIG. 3 shows a flow chart relating to handling the individually packaged goods, with the following parts FIG. 3a separation and start of sorting FIG. 3b completion of sorting in outlets, including alignment

FIG. 3c storage

Figure 3D:
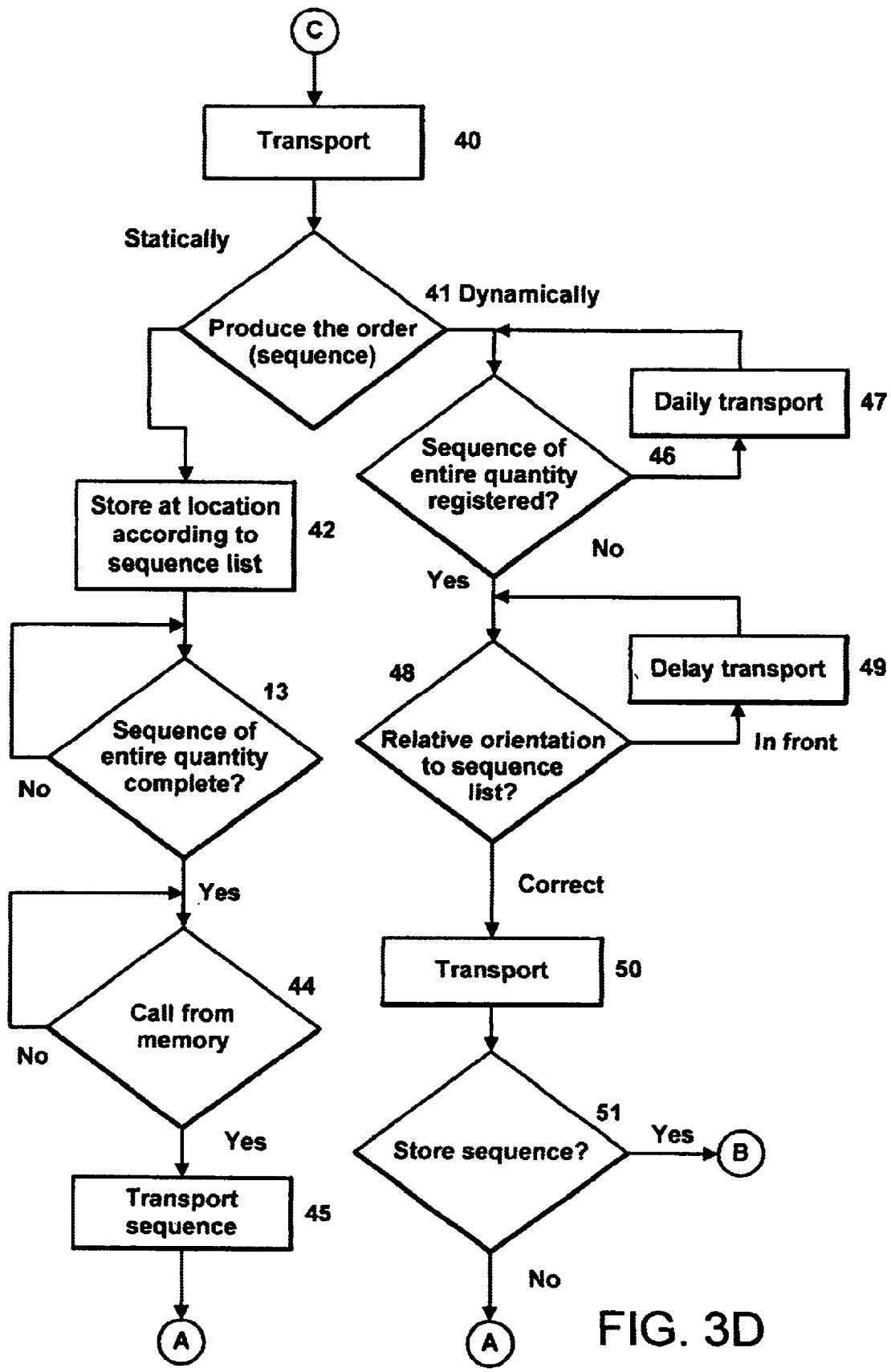

FIG. 3d production of an order (sequences)

FIGS. 4a–h show a simplified example to illustrate the handling operations in different phases.

According to FIG. 1, the individually packaged goods 1 fed in are moved separately in any desired horizontal directions by means of a multiplicity of conveying means 7 which are arranged in a matrix-like or array-like form and have spherical transport parts on which the individually packaged goods are moved. Each individual conveying means 7 is additionally characterized by a variable speed and variable acceleration. The following patents show examples of the configuration of this conveying means: U.S. Pat. No. 5,808,395 "Torque motor" and U.S. Pat. No. 5,410,232 "Spherical motor and method".

All the conveying means 7 are driven or only those on which individually packaged goods 1 are located or will shortly be located. This principle is illustrated in FIG. 2. By means of the separately driven conveying means 7 it is possible to produce defined spacings between the individually packaged goods 1 fed in, and therefore to separate them in a controlled or monitored manner. In addition, there is the possibility of aligning the individually packaged goods 1 as desired in the plane. For the specific control of the arrangement, it is necessary to identify each item 1 as it is fed in, that is to say mainly to record its destination information, and to detect the orientation and outline (form) of the item 1 and to track the item 1 by using these features. The device required for this is designated an image processing device 3. The image processing device 3 comprises an image recording device 4 and an image analyzer 5. The image recording device 4 is expediently arranged above the plane of the conveying means. The data with regard to destination information, present orientation and outline of the individually packaged goods 1 is transmitted to a control device 6. This control device 6 determines and coordinates, on the basis of implemented algorithms and regular refreshing of the information about the current state by means of the image processing device 3, the movement sequence of all the individually packaged goods 1 from their feeding-in until their discharge to the subsequent processing. By using the conveying means 7, the image processing device 3 and the control device 6, it is possible to transport each item 1 from the feed point to the discharge point determined by the destination information. The algorithms implemented in the control device 6 ensure the parallel progress of this process for all the individually packaged goods 1 which are fed into it, so that no collisions occur and a movement sequence is ensured which is optimal in terms of distance and time. In order to store the individually packaged goods 1, this transport process is carried out to a storage destination point, interrupted there for a defined time interval or resumed by means of a remove-from-store request initiated by the control device 6. This process describes the storage function. In the course of removal from store and/or during transport to the discharge point, it may be possible for an order of the individually packaged goods 1, defined previously or to be produced during the process, to be produced when said individually packaged goods 1 arrive at the discharge point, this being qualified by the availability of multidirectional transport, storage function and discrete control of the transport path of individual items 1. This function is helpful, for example, if the individually packaged goods 1 are to be offloaded into a transport means from the discharge point in the reverse order for their further processing.

In the following text, the handling sequence will be explained by using FIGS. 3a–d.

The sequence will be described for one item 1. For clarity, the simultaneous handling of a plurality of individually packaged goods 1 will not be presented, but it is clear that, for this purpose, parallel, continuous coordination of the movement sequences of the individually packaged goods 1 is carried out by the control device 6, with the aid of the image processing device 3 and, if appropriate, further sensors, in order to avoid collisions. Following the feeding 10 of the item 1 by means of transport devices (not shown) at the feed-in point, the orientation and outline 11 are determined. At the same time, it is also established whether the item 1 has to be separated 12, since, for example, it is lying close beside another item 1. If this is so, the separation 12 is carried out. The handling information on the item (in this case the address of the recipient as sorting information) is determined and, from this, the necessary handling 14. The item 1 is then transported onward 15 and the appropriate sorting operation is started 16. If, in this connection, the item 1 is to be transported to a specific discharge point associated with the recipient address 20, then a check is made to see whether the orientation of the item 1 is correct 21. If so, the item 1 is transported to the discharge point 23 and discharged to external transport means 24. If not, further alignment 22 is carried out prior to this. If, within the context of the sorting operation 16, the item 1 is to be stored, then it is transported to a storage area 30 and stored there 31. Storage lasts until the item 1 is called, 32. Following the call, it is transported away 33, either to the relevant discharge point, if no sequencing is necessary, 34, or transport 40 is carried out, in order to produce an envisaged order 41. For this purpose, there is a static and a dynamic variant. In the static variant, the item 1 is stored at a place corresponding to an order list 42. Once all the individually packaged goods have been stored in the envisaged order, 43, and there is a call from the storage area 44, then the entire order is transported to the envisaged discharge point 45. In the dynamic variant, a check is first made to see whether the total quantity for the order has been registered 41. If this is not so, then onward transport is delayed 47, which in an extreme case can mean a stoppage. Following registration, the relative orientation of the item 1 as compared with the orientation according to the order list is checked 48. If it is too far forward, its transport is delayed again 49, if necessary as far as stopping it. If necessary, a lateral movement is additionally carried out, in order that the correct, subsequent individually packaged goods 1 can move up. Once the relevant item 1 has reached the correct position, it is transported onward. Once the correct total order is present, a further decision is made as to whether the sequence is to be stored or transported directly to a discharge point 51.

This general sequence will now be explained using a simple example with an exemplary quantity of goods.

The following components are present:

1. A transport means for discharging the goods
2. An apparatus according to the invention for handling
3. Eight transport means (identification TM I–VIII) for leading the goods away and therefore, at the same time, final sorting positions at the output from the apparatus The exemplary quantity of goods consists of ten box-like individually packaged goods (identification 1–10).

The following handling tasks have to be implemented by the apparatus:

1. From the individually packaged goods identified by 1, 2, 3 and 4, a sequence corresponding to the order of the numbering is to be produced dynamically, and this sequence is to be fed to the transport means (TM) VIII.
2. Item 5 is to be fed to TM II.
3. Item 6 is to be fed to TM I.
4. Item 7 is to be stored and then fed to TM V.
5. From the individually packaged goods 8, 9 and 10, a sequence in the order of the numbering is to be produced statically, and this is then to be fed to TM IV without further storage.

In addition to the handling tasks represented above, the individually packaged goods are to be aligned by the apparatus in accordance with the handling tasks.

FIG. 4a shows the initial state. The individually packaged goods 1 to 10 are fed to the device in a single layer, in an unordered sequence and with a very wide range of horizontal alignments by the transport means "feed", that is to say are fed in. When they arrive on the apparatus, the orientation of the individually packaged goods and their distance from one another are determined. From this information, the control device 6 determines the necessary movement sequences for each individual item.

Figure 4B:
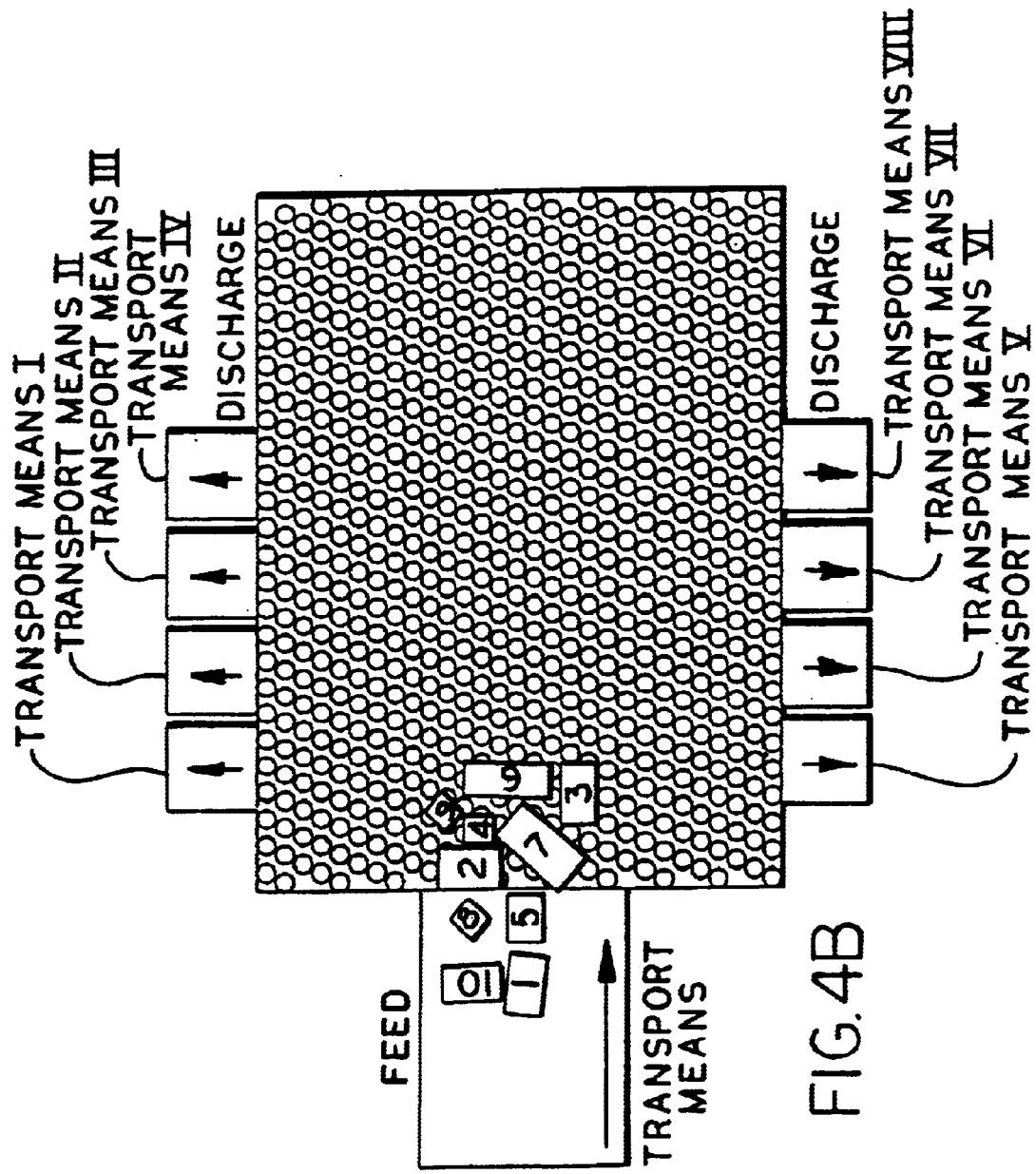

FIG. 4b shows the start of the separation process. Once the individually packaged goods have been separated, their destination, that is to say the final sorting point—here the transport means I–VIII—is identified by means of the image processing device 3 and the control device 6, and the appropriate handling tasks are linked to them.

Figure 4C:
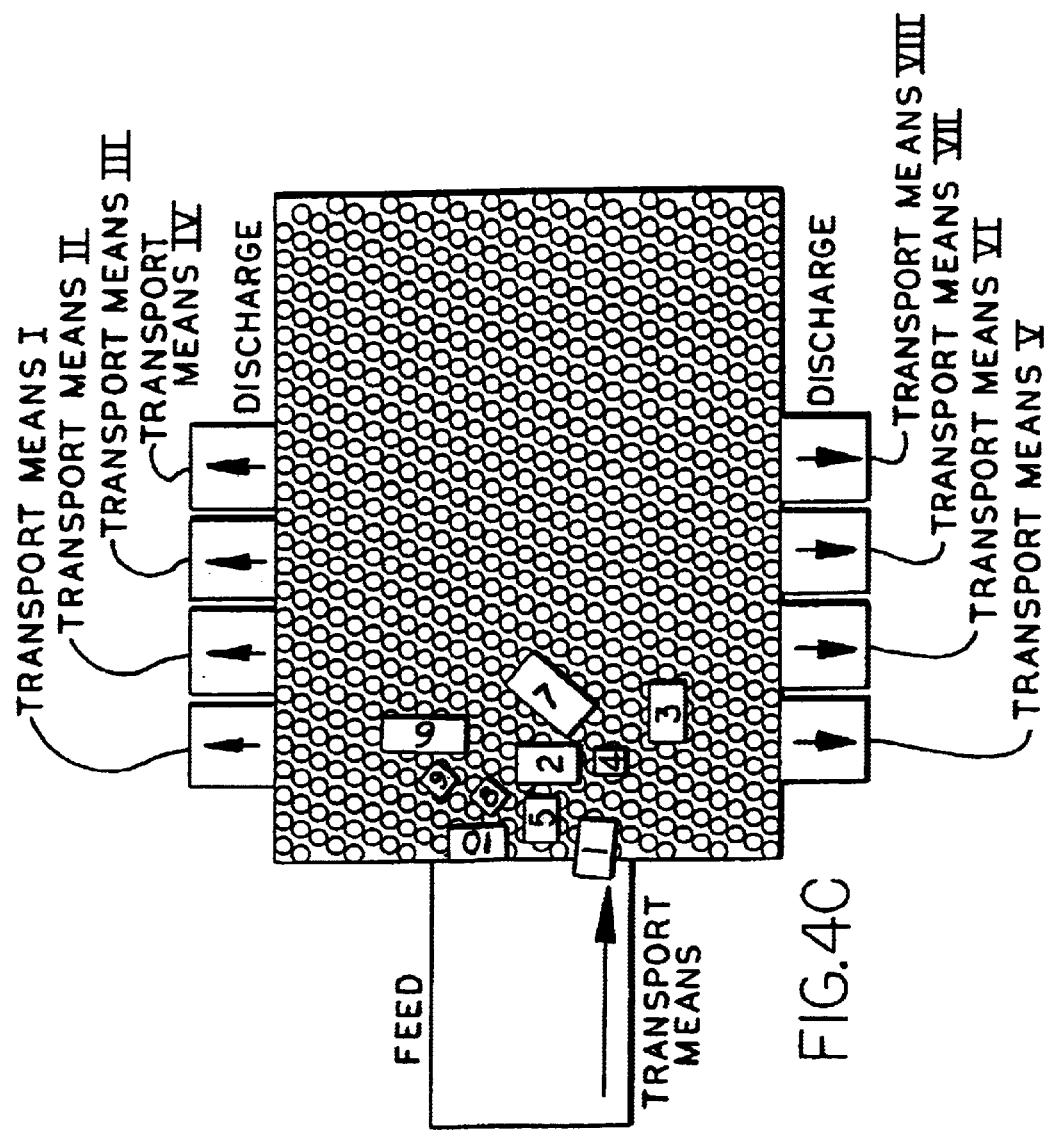

FIG. 4c illustrates the start of the sorting operation, that is to say the individually packaged goods are moved in a targeted manner to the appropriate final sorting point or an intermediate destination within the apparatus (here, for example, the storage locations for the static sequencing). The individually packaged goods have left the transport means "feed". The separation operation has been completed. At the same time, the alignment of the individually packaged goods is carried out in accordance with the handling task. This alignment operation is carried out during the entire handling of the individually packaged goods on the apparatus, and for this reason it will not be mentioned again. The individually packaged goods 1 to 4 are in the order 3, 4, 2, 1 in the direction of their destination, the TM VIII.

FIG. 4d shows the continuation of the sorting operation and the start of dynamic and static sequencing. In order to produce the desired destination order 1, 2, 3, 4 from the individually packaged goods order 3, 4, 2, 1, the items 2 and 1 "overtake" the items 3 and 4. Item 5 is transported in the direction of TM II, the final sorting point allocated to it. Item 6 is transported in the direction of TM I, "its" final sorting point. Item 7 is about to reach its storage position. Items 8, 9 and 10 are being moved in the direction of their intermediate storage locations linked with their static sequencing.

Figure 4E:
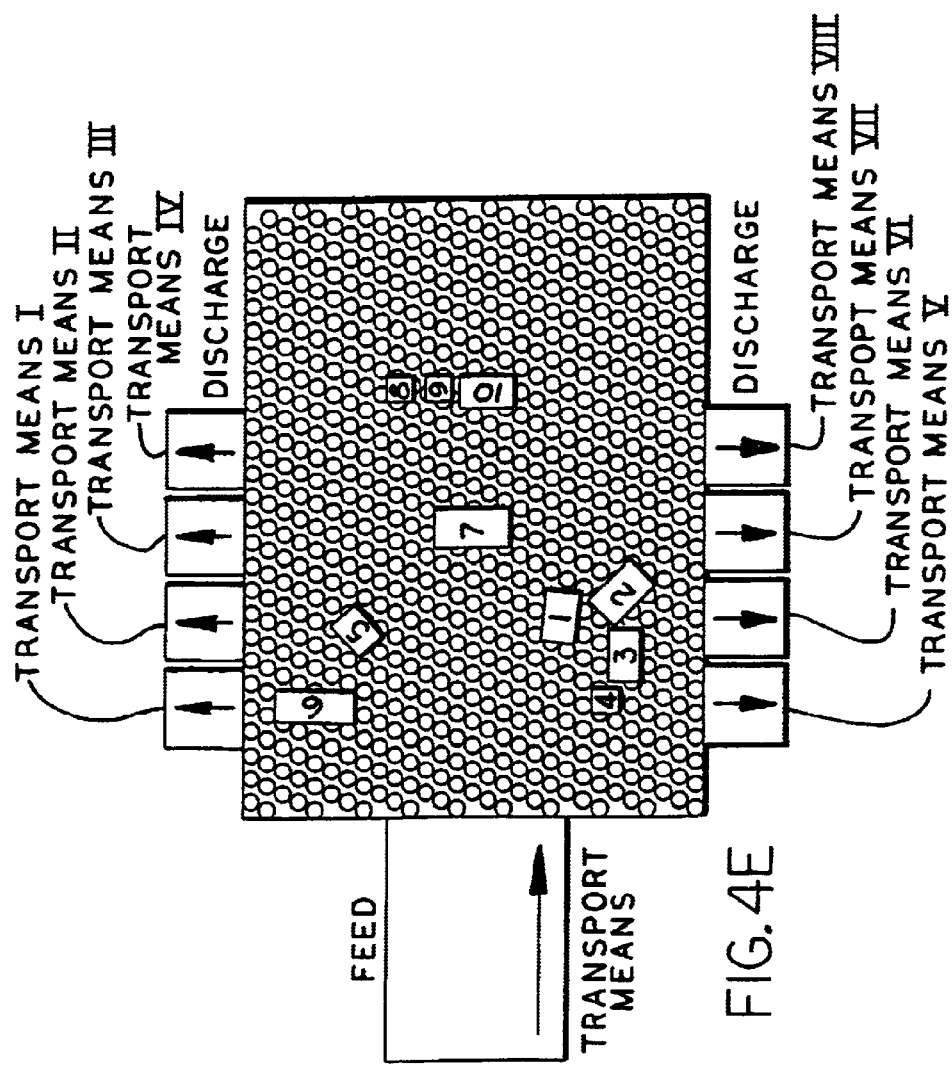

FIG. 4e illustrates the continuation of sorting, dynamic and static sequencing and storage. Item 2 has overtaken items 3 and 4, and item 1 is located between 2 and 3, and therefore still has to pass item 2 in order that the correct order is achieved. Item 5 is conveyed further in the direction of TM II, and item 6 in the direction of TM I. Item 7 has reached its storage position and is stopped there. Items 8, 9 and 10 are stopped at their intermediate storage locations linked with the static sequencing.

Figure 4F:
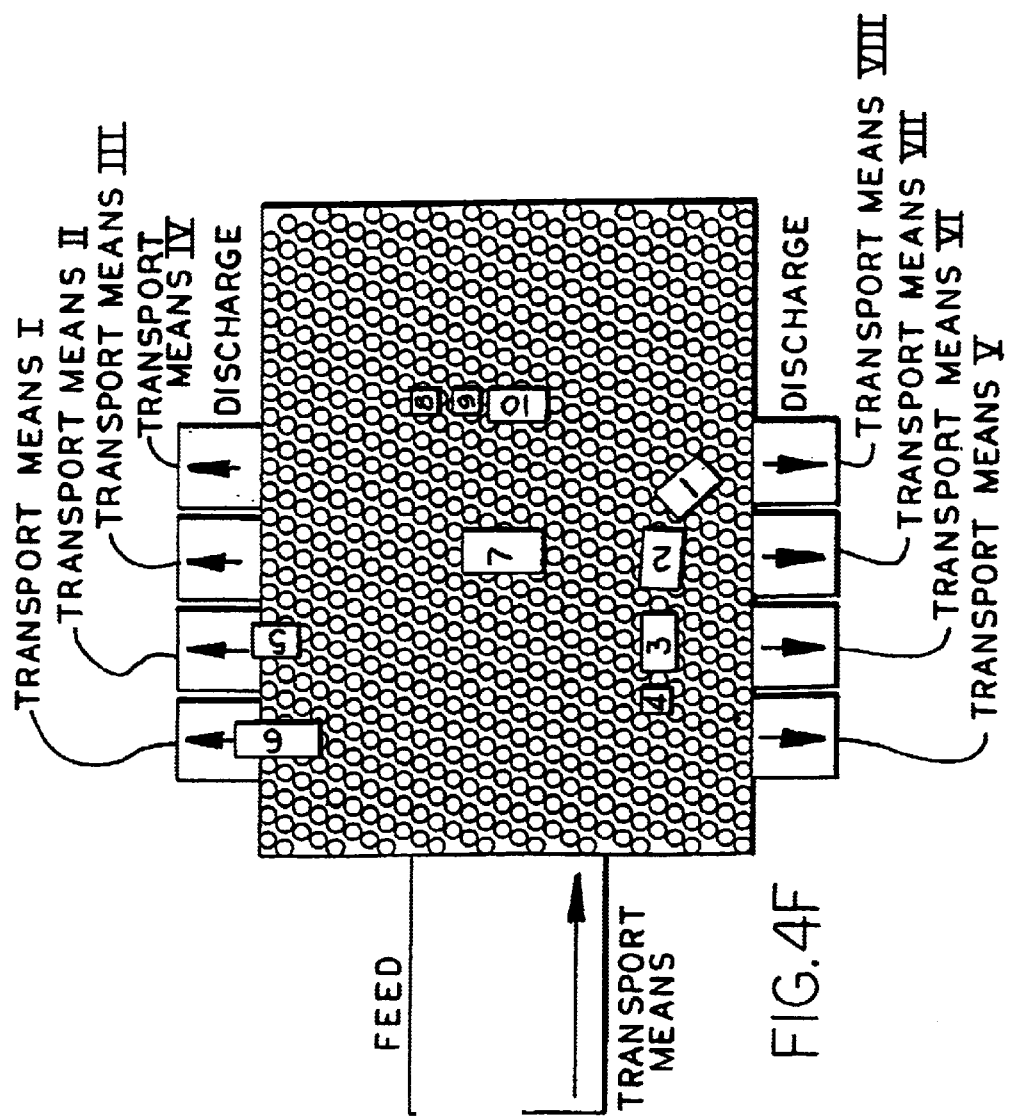

FIG. 4f shows the further continuation of sorting, dynamic and static sequencing and storage. Item 1 has overtaken items 2, 3 and 4, and therefore the correct order 1, 2, 3, 4 has been reached. The sequence 1, 2, 3, 4 is being transported in the direction of TM VIII, its final sorting point. The dynamic sequencing has therefore been concluded. Items 5 and 6 have reached their final sorting positions TM II and TM I and are being discharged onto the TM leading away.

Item 7 remains in its storage position until the removal from store is initiated by the appropriate control command. Items 8, 9 and 10 remains at their intermediate storage locations until the appropriate control command to transport them away to the final sorting point TM IV arrives.

Figure 4G:
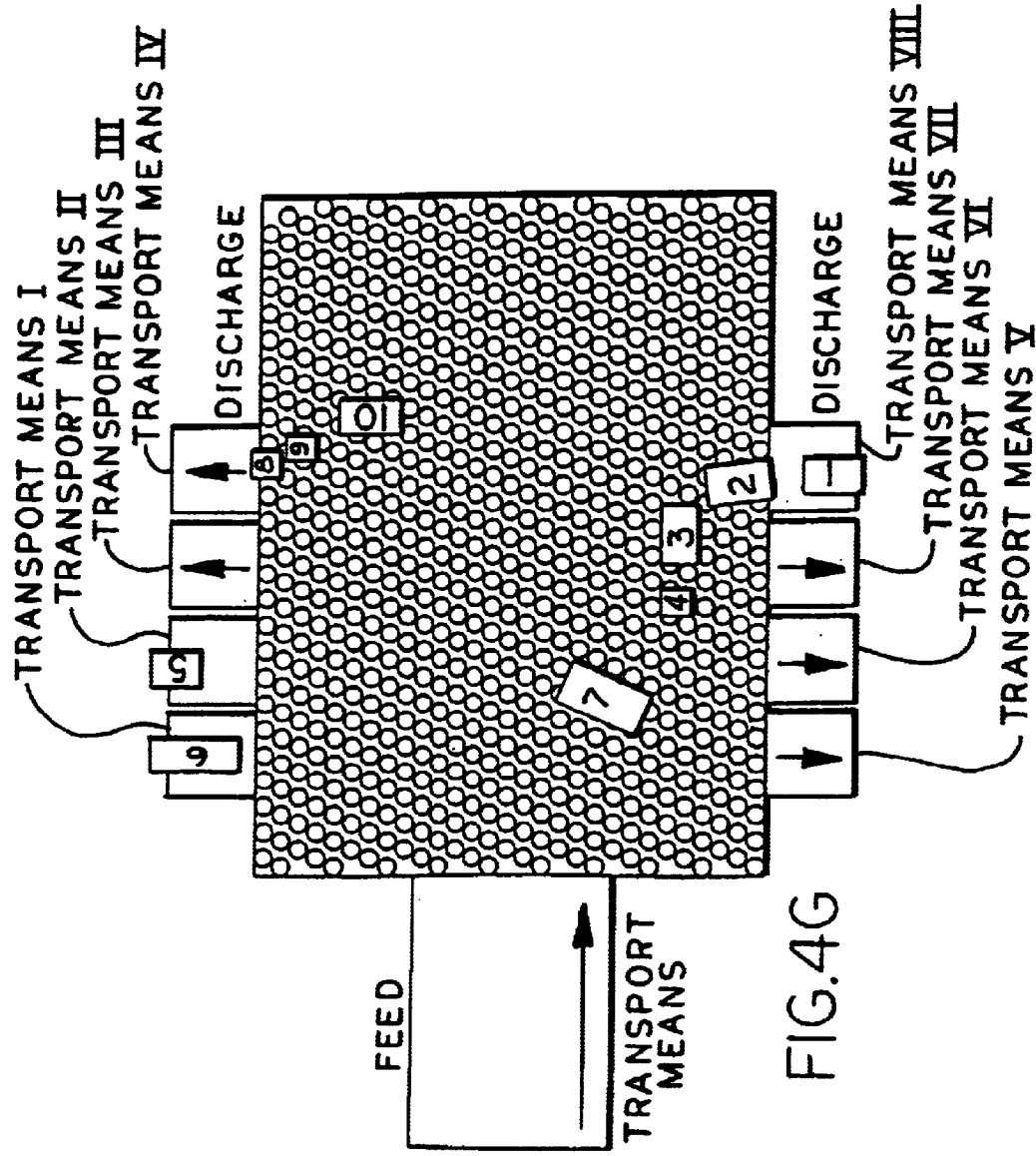

FIG. 4g shows the continuation of the sorting, the removal from store and the completion of the static sequence. The sequence of items 1, 2, 3, 4 has reached its final sorting point TM VIII with item 1 and is being discharged from the apparatus there. Items 5 and 6 have left the apparatus. The command to remove item 7 from store has already been given, and it is therefore on the way to its final sorting point, TM V. The control command to transport items 8, 9 and 10 away has been given, and they are being transported in the direction of TM IV whilst maintaining their order, and item 8 has already reached TM VIII.

FIG. 4h shows the final state of the handling process. All the individually packaged goods have been discharged from the apparatus, and are to some extent still on the discharging transport means assigned to them as final sorting points.

What is claimed is:

1. An apparatus for handing individually packaged goods, which are fed and discharged lying beside and/or behind one another by transport means, having at least one input, at least one output and at least one image processing device (3) for determining handling information classifying the individually packed goods (1) from recorded images of the individually packaged goods (1), said apparatus comprising:

a plurality of conveying means (7) which are arranged in the manner of an array in one plane and move the individually packaged goods (1) in the plane, in each case at least in four directions at right angles to one another, each of the individually packaged items (1) within the array area always being located on at least three conveying means (7), and by at least one control device (6) for the independent activation of each individual conveying means (7), at least with regard to conveying direction and period, in order to move the individually packaged goods (1) without collision in accordance with a handling plan, which links the handling to be carried out with the handling information about the individually packaged goods (1), for this purpose the location and orientation of each classified item (1) being determined online by tracking the recorded images or outlines with the aid of the image processing device (3) and/or further sensor devices.

2. The apparatus as claimed in claim 1, characterized in that the conveying means (7) possess a rotatable, spherical transport part, that is mounted without a fixed axis and is driven in a transport direction that can be selected freely.

3. The apparatus as claimed in claim 1, characterized in that the conveying speed and the acceleration and braking pattern of each conveying means (7) can be selected by the control device (6).

4. The apparatus as claimed in claim 1, characterized in that in order to determine the location and orientation of the individual items (1), a sensor device which records the height profile is provided in addition to the image processing device (3) which records the occupied areas.

5. The apparatus as claimed in claim 1, characterized in that in order to determine the location and orientation of the individual items (1), each conveying means (7) has a pressure sensor which detects an item (1).

6. The apparatus as in claim 2, characterized in that the conveying speed and the acceleration and braking pattern of each conveying means (7) can be selected by the control device (6).

* * * * *